United States Patent [19]

Tsau

[11] Patent Number: 5,388,771
[45] Date of Patent: Feb. 14, 1995

[54] FROZEN LIQUID GRANULATION PROCESS

[76] Inventor: Josef H. Tsau, 5348 Brummel St., Skokie, Ill. 60077

[21] Appl. No.: 103,704

[22] Filed: Aug. 9, 1993

[51] Int. Cl.⁶ ............................................. B02C 23/36
[52] U.S. Cl. ........................................ 241/17; 241/22; 266/147
[58] Field of Search ........................ 241/15, 17, 21, 22, 241/23, 27, 65, 16, 30; 366/4, 7, 147, 148

[56] References Cited

U.S. PATENT DOCUMENTS

| | | | |
|---|---|---|---|
| 2,595,631 | 5/1952 | Bertsch | 366/7 |
| 3,712,593 | 1/1973 | Szatmari | 366/7 |
| 3,965,267 | 6/1976 | Davis | 241/23 X |
| 4,394,498 | 7/1983 | Kastelic | 241/23 X |
| 5,100,239 | 3/1992 | Ono et al. | 366/7 |
| 5,104,232 | 4/1992 | Lennox, III | 366/147 X |

FOREIGN PATENT DOCUMENTS

| | | | |
|---|---|---|---|
| 56-14344 | 4/1981 | Japan | 241/23 |
| 345965 | 8/1972 | U.S.S.R. | 241/23 |

*Primary Examiner*—Timothy V. Eley
*Attorney, Agent, or Firm*—Welsh & Katz, Ltd.

[57] ABSTRACT

Replacing binder liquid with ground frozen binder liquid to granulate powders in a mechanical mixing granulator resulting in improving granulation homogeneity, reducing processing time, and simplifying the granulation method.

8 Claims, No Drawings

FROZEN LIQUID GRANULATION PROCESS

INTRODUCTION

Granulation technology has been extensively utilized to reduce dust, improve flow character, increase or reduce dissolution rate, reduce interactions among ingredients, and change bulk density by various industries including pharmaceutical, food, and agriculture industries. One of the most broadly utilized granulation methods is mechanical mixing granulation which granulate powders in a mechanical mixer using a binder solution or solvent. This popular method still has the following major drawbacks and limitations.

1. This method produces a broad range of granular particle sizes which means low yield for obtaining a desired narrow range particle size product.

2. This method requires long granulation time since slow addition of binder liquid is required to avoid inhomogeneous granulation and extensive agglomeration.

3. Many highly soluble and sticky wet powder materials can not be granulated to a desired size range particles by this method since it can not prevent extensive agglomeration to occur.

The highly soluble and sticky powder materials may be granulated in a fluid-bed granulator, which, however, only makes fluffy and fragile types of granules. A mechanical mixing granulation method, meanwhile, produces denser and harder granules than a fluid-bed granulation method. In other words, these two granulation methods are different in their applications.

There is, therefore, a need to improve the mechanical mixing granulation method.

SUMMARY OF THE INVENTION

The invention relates to an uniquely effective and simple method to quickly add entire binder liquid and to homogeneously mix it with the entire powder to homogeneously wet and granulate. Instead of using binder liquid, the inventive method uses frozen binder liquid, ground to pieces or powder, to granulate powders. This frozen binder liquid addition method significantly reduces the processing time, improves the homogeneity of granulation or the yield for producing a narrow particle size range granular product, and extends the application to granulate highly soluble powders of the mechanical mixing granulation method. It also extends the application range of binder liquids to high viscosity and semi-solid binders, which are too difficult to use by conventional liquid spraying and pumping addition methods.

DETAILED DESCRIPTION OF THE INVENTION

The mechanical mixing granulation method is known to have the following problems:

1. It makes granules having broad particle size range.
2. It has long binder liquid addition or processing time.
3. It can not properly granulate many highly soluble and sticky powder materials.

All high shear energy granulators, which have essentially optimized the mixing efficiency of mechanical mixers, still have the above problems. Not wishing to be bound by any theory the problems appear to have a common cause, a non-homogeneity distribution of binder liquid in the granulated product resulting in non-uniform growth in granular particles. Mechanical mixing granulators have one or more inlets to add binder liquid to powder while mixing. The binder liquid is added by pumping in through the liquid inlets with or without atomized nozzle spraying. These binder liquid addition methods can only add the liquid onto a small portion of the fluidized powder at any time. These non-uniform binder liquid adding methods appear to be the major cause of the above problems. The invention relates to a surprisingly simple and economical binder liquid addition method to eliminate this major cause and, thus, to solve all the above problems simultaneously. Instead of using binder liquids, which interact instantaneously with powder on contact, the inventive method uses frozen powder or granular particles of binder liquids. The frozen binder liquid particles can be added all at once to the dry powder in the granulator right before starting to mix and to granulate. They can also be added through a insulated feeder to the dry powder while mixing to granulate it. In any case, the frozen particles begin to melt to release binder liquid only after they are mixed with the entire powder.

Either a solvent or a binder solution is used to granulate powder particles. When a powder is soluble or partially soluble, a solvent can be used to granulate it. When a powder is not soluble and its wetted powder is not sticky, a binder solution is needed to granulate it. For adding a solvent to slow dissolving powders, there is a time delay for binding effect to fully develop. For granulating very slow dissolving powders, solvent can be added by simply pumping in to wet part of the powder and the mixing action of the granulator can homogeneously mix the liquid with the entire powder resulting in forming uniform granular particles. In most cases, however, the binding effects start as soon as the liquid binder contacts the powder particles and the binder liquid needs to be sprayed in while mixing. The uniformity of granulation depends, partially, on how fine the binder liquid spraying particles are atomized and how uniform the liquid particle sizes are. Since the binder liquid is added to only a small portion of the powder, only this wetted powder portion forms granules. If the liquid is added too fast, this wetted portion of powder will form undesirably large granular particles. It is necessary, therefore, to add binder liquid slowly, in order to build up more uniform granular particle sizes. Often, compromise is needed between having a reasonably short processing time and obtaining a less than desired broad range of granular particle size. When the powder is highly soluble to form sticky liquid, even a very slow liquid addition or time consuming granulation process can not avoid failures, e.g., from extensive agglomeration. Another common technical problem of mechanical mixing granulation methods is that the fluidized powder particles often quickly block the liquid spraying nozzles making it very difficult to continuously spray fine binder liquid particles to achieve uniform granulation.

The above discussed problems are as old as the granulation methods. It is, therefore, surprising that a simple and economical method exists to solve them all simultaneously. The frozen binder liquid powder can be kept at a below melting point temperature before use. It can be added directly to a dry powder in a granulator immediately before starting mixing and granulating. It will not start to melt for a brief moment, which is long enough to allow it to be mixed with the entire dry powder. It then begins to melt quickly by the mixing action and the large heat capacities of the equipment, which may have its jacketed cold or warm water running, and the dry powder. Still, it takes some time to melt the frozen particles during intense mixing and granulating allowing very uniform wetting of the powder and granulation. A preferred method, however, is to add the ground frozen binder liquid into the granulator which has already been loaded with the dry powder, while mixing, through an insulated feeder. Another preferred method is to pre-mix the ground frozen binder liquid with the dry powder and then feed the powder mix into a continuous mechanical mixing granulator. Since the equipment and the powder usually have large enough heat capacity, with the aid of intense mixing, the frozen powder should completely melt quickly. In other words, a frozen binder liquid process can achieve much better uniform powder wetting and granulation level with much short processing time than a liquid binder process. The frozen binder liquid process also can uniformly mix a very small amount of binder liquid with a large amount of a highly soluble or sticky powder, such as Maltodextrins, polydextrose, food gums, flavors, etc., to granulate them.

Any liquid can be frozen, ground or crushed and used as binder liquid. Water and water solutions of solid binders are, however, the most useful and practical binder liquids for the utilization of this invention. Pure alcohols, such as methanol, ethanol, and propyl alcohols have very low freezing points and, therefore, have little practical application values. Some alcohol water mixtures do, however, have acceptably high freezing point and some applications for dissolving water-insoluble binders such as zein. Only solid binders are practically useful. They can be dissolved in water or water-alcohol mixtures to form binder liquids. Besides, this invention can utilize very thick, such as cream-like and paste-like, binder liquids, since they can be frozen and ground or crushed into easy to handle powders, which is used by this invention to granulate powder compositions. Both fine and large frozen binder liquid pieces can be used. The large frozen binder liquid pieces are further broken down by the intense mixing of the granulator. Even when the large frozen pieces stay intact during mixing, they release binder liquid slowly also resulting in homogeneous distribution.

A mechanical mixing granulator can be a variable speed mixer which perform mixing at lower speed and granulating at higher speed. It may have two types of mixing devices, such as a set of large plow mixers and a set of choppers, such as the Mixmill of Processall. Only its plow mixers can perform effective mixing function but both its choppers and plow mixers can be used to perform granulation. There are The following examples further demonstrate the skill but not to limit the spirit and the scope of the invention.

EXAMPLE 1

A Presto MinnieMax compact Food Processor is utilized to serve as a (vertical) high shear energy granulator, since it performs essentially the same intense mixing function as a intense mixing granulator.

The ice cubs in a double layered plastic bag is powdered by a hammer and stored in a freezer before use.

The powdery contents of 20 Wyler's unsweetened Orange soft drink mix packets are emptied into the food processor. A very small amount of ice powder is sprinkled in. The food processor is quickly covered and started mixing for about 1 minute. A uniform size fine granules, ~-80-120 mesh, is obtained. Then, about the same amount of ice powder was added again and mixed for another minute. A uniform size, ~40-60 mesh, spherical granular particles are obtained. They tend to stick together and should be immediately dried in a fluid-bed drier. The powder drink mixes are highly soluble and sticky powders which can not be properly granulated by a conventional mechanical mixing granulation method which adds binder liquid to granulate. mechanical mixers whose container also rotates to enhance mixing and granulation actions, such as the Mix Pelletizer of Eirich Machine. There are continuous mechanical mixing granulation equipments having both powder and liquid inlets at one end and an outlet at the other end. The powder and the liquid are mixed and granulated in its intense mixing chamber, which mixes with a series of rotating bars or pins, such as the Turbulizer of Bepex. Since the residence time in such a continuous granulation equipment is very short, a pre-mixing step to mix a dry powder with its ground frozen binder liquid at a proper ratio predetermined experimentally is helpful to allow time to melt the frozen powder. Granulation is achieved by mixing a powder with its binder liquid. Often, granulation only occurs at very high speed mixing. It is often desirable to mix a powder and its ground frozen binder liquid at a below granulation speed to obtain a homogeneous mixture before increasing mixing speed to granulate it. The drying equipment used by conventional mechanical mixing granulation methods, such as tray dryer, fluid-bed dryer, and turbo-dryer, can be used.

The frozen binder liquid method eliminates the need of a liquid delivery system and its associated problems discussed above. It therefore significantly simplifies the mechanical mixing granulation processes and reduces the equipment cost.

EXAMPLE 2

Corn starch powder is widely used in cooking to add thickness to the soup of cooked dishes. It is powdery to use and needs to be dispersed in water before use. Otherwise, large starch lumps can form in cooked dishes. There is, therefore, a need for instantly dispersible fine granular starch product. Corn starch is insoluble and non-sticky and, therefore, needs a granulation binder. The gelatinized (cooked) corn starch is paste-like but can serve as a granulation binder of this inventive method.

A teaspoonful corn starch is dispersed in about 150 ml water and cooked in a microwave oven to form a soft paste. It is frozen in a freezer, crushed by a hammer, and kept in freezer before use. The same compact food processor of EXAMPLE 1 is used.

About 200 g of corn starch powder is added into the food processor. Some frozen powder of gelatinized corn starch paste is added and immediately started to mix for about 1 minute. After 3 additions and mixings, very fine spherical granules are formed. After 4 additions and mixings, a desired fine granular product having about 60–100 mesh size range obtained. It was dried in an oven. It can be used in a shaker to sprinkle in foods while cooking without dusting and forming lumps.

What is claimed is:

1. A mechanical granulation method for dry powder materials having improved homogeneity of granulation and reduced processing time including the steps of mixing in a mechanical mixer a dry powder material with ground frozen binder liquid particles to achieve an evenly dispersed mixture, melting said frozen binder liquid particles to obtain a uniformly wetted powder and then mixing said mixture in a granulator to form a granulated mixture.

2. The mechanical mixing granulation method of claim 1 comprising the steps of:
   a. adding dry powder to a mechanical mixer;
   b. quickly adding ground frozen binder liquid on top of the powder;
   c. immediately starting mixing to gradually melt the frozen binder liquid particles and uniformly wet the powder;
   d. continuing mixing till the completion of both the melting of all frozen binder liquid particles and formation of said granulated mixture.

3. The mechanical granulation method of claim 1 comprising the steps of:
   a. adding dry powder to a mechanical mixer;
   b. starting mixing;
   c. adding a needed amount of ground frozen binder liquid to the mechanical mixer through an insulated feeder;
   d. continuing mixing till the completion of both the melting of frozen binder liquid particles and the formation of said granulated mixture.

4. The mechanical granulation method of claim 1 wherein the steps of mixing and mixing in a granulator include:
   a. mixing a dry powder material with a proper amount of a ground frozen binder liquid in a mechanical mixer until all frozen binder liquid particles are melted to obtain an uniformly wetted powder;
   b. feeding the uniformly wetted powder into a continuous mechanical granulator to granulate.

5. The mechanical granulation method of claim 1 wherein said mechanical mixer is selected from the group consisting of a high shear energy granulator, a mechanical mixer with choppers, a mix pelletizer, and a continuous mixing granulator.

6. The mechanical granulation method of claim 1 wherein said binder liquid is selected from the group of water, water alcohol solutions, water and water alcohol solutions of binders, water and water alcohol solution based creams and pastes of binders.

7. The method of claim 1 further including the steps of removing liquid in the uniformly wetted product with a dryer.

8. The method of claim 7 wherein said dryer is selected from the group consisting of tray dryers, fluid bed dryers, and turbo-dryers.

* * * * *

UNITED STATES PATENT AND TRADEMARK OFFICE
CERTIFICATE OF CORRECTION

PATENT NO. : 5,388,771
DATED : February 14, 1995
INVENTOR(S) : J. Tsau

It is certified that error appears in the above-indentified patent and that said Letters Patent is hereby corrected as shown below:

Column 3, line 53, after "There are" please insert:

--mechanical mixers whose container also rotates to enhance mixing and granulation actions, such as the Mix Pelletizer of Eirich Machine. There are continuous mechanical mixing granulation equipments having both powder and liquid inlets at one end and an outlet at the other end. The powder and the liquid are mixed and granulated in its intense mixing chamber, which mixes with a series of rotating bars or pins, such as the Turbulizer of Bepex. Since the residence time in such a continuous granulation equipment is very short, a pre-mixing step to mix a dry powder with its ground frozen binder liquid at a proper ratio predetermined experimentally is helpful to allow time to melt the frozen powder. Granulation is achieved by mixing a powder with its binder liquid. Often, granulation only occurs at very high speed mixing. It is often desirable to mix a powder and its ground frozen binder liquid at a below granulation speed to obtain a homogeneous mixture before increasing mixing speed

UNITED STATES PATENT AND TRADEMARK OFFICE
CERTIFICATE OF CORRECTION

| | | |
|---|---|---|
| PATENT NO. : | 5,388,771 | Page 2 of 2 |
| DATED : | February 14, 1995 | |
| INVENTOR(S) : | J. Tsau | |

It is certified that error appears in the above-indentified patent and that said Letters Patent is hereby corrected as shown below:

to granulate it. The drying equipment used by conventional mechanical mixing granulation methods, such as tray dryer, fluid-bed dryer, and turbo-dryer, can be used.

The frozen binder liquid method eliminates the need of a liquid delivery system and its associated problems discussed above. It therefore significantly simplifies the mechanical mixing granulation processes and reduces the equipment cost.--.

Column 4, delete lines 10-36.

Signed and Sealed this

Seventh Day of November, 1995

Attest:

BRUCE LEHMAN

Attesting Officer

Commissioner of Patents and Trademarks